US007263037B2

(12) United States Patent
Haas

(10) Patent No.: US 7,263,037 B2
(45) Date of Patent: Aug. 28, 2007

(54) ONE PIECE SELF-EXPIRING SECURITY BADGE OR LABEL

(76) Inventor: David J. Haas, 19 W. Gate Rd., Suffern, NY (US) 10901

( * ) Notice: Subject to any disclaimer, the term of this patent is extended or adjusted under 35 U.S.C. 154(b) by 123 days.

(21) Appl. No.: 11/325,052

(22) Filed: Jan. 5, 2006

(65) Prior Publication Data

US 2007/0153641 A1 Jul. 5, 2007

(51) Int. Cl.
*G04B 17/00* (2006.01)
*G01N 31/32* (2006.01)

(52) U.S. Cl. ....................................... 368/327; 116/200

(58) Field of Classification Search ................ 368/327, 368/114; 116/200, 207, 217, 300; 422/56-58, 422/61

See application file for complete search history.

(56) References Cited

U.S. PATENT DOCUMENTS 5,446,705 A * 8/1995 Haas et al. ................. 368/327
5,699,326 A * 12/1997 Haas et al. ................. 368/327
5,930,206 A * 7/1999 Haas et al. ................. 368/327
5,974,003 A * 10/1999 Pedicano et al. ........... 368/327
6,295,252 B1 * 9/2001 Holt et al. .................. 368/327
6,452,873 B1 * 9/2002 Holt et al. .................. 368/327
6,614,728 B2 * 9/2003 Spevacek .................... 368/327
6,801,477 B2 * 10/2004 Braunberger ............... 368/327

* cited by examiner

*Primary Examiner*—Vit Miska
*Assistant Examiner*—Thanh S. Phan
(74) *Attorney, Agent, or Firm*—Michael Zall

(57) ABSTRACT

A self-expiring badge or label that includes an upper substrate having an upper surface and a lower surface and an adhesive activator layer on the lower surface. A protective layer having a first surface and a second surface is provided, with the first surface of the protective layer being removably attached to and overlaying the adhesive layer. A lower substrate is provided that has an upper surface and a lower surface, the upper surface being removably attached to and overlaying the second surface of the protective layer. A migrating ink pattern is on the lower surface of the lower substrate. To activate, the upper substrate and at least a portion of the lower substrate are removed from the protective layer to leave a remaining portion of the lower substrate having the migrating ink pattern thereon. The migrating ink pattern is then contacted with the exposed adhesive activator layer to activate the migrating ink pattern to migrate through the adhesive activator layer and upper substrate in a selected time interval for viewing from the upper surface of the upper support layer to indicate an expired badge or label. Preferably the migrating ink pattern is contacted with the adhesive layer by folding it onto the adhesive layer. Optionally, to activate the badge both substrates are completely removed from the protective layer and the migrating ink pattern is contacted with the adhesive layer.

9 Claims, 6 Drawing Sheets

ONE PIECE SELF-EXPIRING SECURITY BADGE OR LABEL

BACKGROUND OF THE INVENTION

1. Field of the Invention

This invention relates to a one piece self expiring security badge, label, ticket and pass. More particularly, this invention is directed to a one-piece self-expiring security badge or label that is thin and flexible wherein the badges or labels can easily pass through a laser or thermal printer, and can be easily stored in a roller form.

2. Related Art

Self-expiring security badges or labels have as their core technology a chemical color-changing process that can be easily activated at a specific time. Security badges are only one of the many applications for such technology. Generally, such products are useful because the color changing process is easily activated and after a predetermined period of time has passed and the color changing process is completed, they cannot be used again. Such products have found wide acceptance due primarily to their 'ease of use'. Such technologies are described in the prior art Haas, Holt and Pedicano patents listed herein and are incorporated herein by reference.

Generally, such color changing process is activated by overlaying and adhesively bonding two substrates to each other. Prior to activation the substrates are kept separate. Typically, the top or exposed substrate is an adhesive label and the bottom substrate has a migrating ink or dye on or within its face. When bonded together, the adhesive from the top label dissolves the dye in the migrating ink, causing it to bleed (diffuse) 'through' the top label at a controlled rate. After a predetermined period of time, the dye-colored image is displayed through the front of the top material and can be seen by those viewing the badge or label. Such badge or label is thus expired, i.e., "self expired" and cannot be used again.

Generally, such known self-expiring badges and labels are initially in two separate pieces, i.e., the top adhesive label and bottom dye or ink containing substrate, and are assembled at the time of issuance, i.e., activation. Because the two substrates are dry materials, they have very long shelf-lives, making these products very commercially practical. However, where there is a high volume of badges or labels issued by, for example, receptionists and security guards the two part construction proves to be inconvenient and labor intensive. There is a need for a simpler badge or label that requires less labor to activate.

Several preassembled constructions have been developed, see for example U.S. Pat. No. 5,107,470 to Pedicano et al. In this type constructions, the top substrate and bottom substrate are joined together with a paper liner interleaved between the adhesive on the top substrate and the bottom substrate containing the migrating ink. When the security badge is issued, the issuer separates the two parts by lifting the top substrate and pealing away the interleaving paper liner from the top substrate. This exposes the adhesive underlying the top substrate so that when the two parts are pressed together the top substrate adhesively bonds to the bottom substrate activating the color changing process, i.e., dissolving the migrating ink. This preassembled construction is simpler and more convenient to use, i.e., it is "user friendly." Such preassembled badges or labels also minimize one of the primary weaknesses of the two part constructions which is the failure of a receptionist or security guard to activate the product when it is issued. This is a common occurrence with badges or labels that come in two separate parts, generally because the receptionist or security guard is untrained or careless in distributing and activating such badges or labels.

However, such preassembled badges or labels as exemplified by Pedicano, have several technical problems. First, such preassembled security badges or labels as well as the two piece badges or labels each have a waste liner that needs to be removed and disposed of. If, for example, there are a large number of visitors to a facility, such waste liners can be a substantial nuisance and housekeeping problem, particularly if not disposed of properly. The liners typically have a silicone coating on one side, are slippery and collect static electricity, causing collection problems. Second, such preassembled badges or labels are stiff and rigid because they are constructed from multiple ply layers. For example, a two piece pre-activated badge or label has a top adhesive substrate with three layers, a face stock layer, an adhesive layer and a liner, while the preassembled construction badge or label consists of five layers: a face stock, an adhesive layer, a removable liner barrier, a bottom-substrate face stock, and a bottom-substrate liner. In order to store such badges or labels, they need to be fan folded. Fan folded badges or labels typically lays in stacks about 2-3 inches high and are folded every two or three badges or labels. This requires that the stacks of badges or labels be outside the computer printer and occupy substantial desk space. Since most security badges are issued from a small receptionist desk in the lobby where surface area is at a premium, it is important to employ security badge printers and badge supplies that have as small a footprint as possible. If the fan folded badges or labels were folded every four badges or labels, they stack of badges or labels would be 12 inches long, protruding from the rear of the thermal printer. This is inconvenient and impractical.

The applicant is aware of the following prior art (US patents):

3,520,124 to Myers
4,408,557 to Bradley et al
4,903,254 to Haas
5,058,088 to Haas et al
5,446,705 to Haas et al
5,602,804 to Haas
5,633,835 to Haas et al
5,633,836 to Langer et al
5,667,303 to Arens
5,699,326 Haas et al
5,715,215 to Haas et al
5,719,828 to Haas et al
5,822,280 to Haas
5,930,206 to Haas et al
5,974,003 to Pedicano et al
6,270,122 to Shadle
6,295,252 to Holt et al
6,452,873 to Holt et al
6,641,691 to Shadle et al
6,741,523 to Bommarito
6,752,430 to Holt et al
6,916,130 to Holt et al

OBJECTS AND SUMMARY OF THE INVENTION

It is an object of this invention to provide a one-piece self expiring badge, label, ticket or pass.

It is a further object of this invention to provide a one-piece self expiring badge, label, ticket or pass that has a minimal number of waste liners that need to be disposed of after activation.

It is another object of this invention to provide a one-piece self expiring badge, label, ticket or pass that is thin, flexible and can be easily stacked and stored.

Another object of the invention is to provide a one-piece self expiring badge, label, ticket or pass that can easily pass through a laser or thermal printer.

All of the foregoing objects of this invention and others are achieved by the self-expiring badge or label of this invention. The badge or label comprises an upper substrate having an upper viewing surface and a lower surface and an adhesive activator layer on the lower surface. A protective layer having a first surface and a second surface is provided, with the first surface of the protective layer being removably attached to and overlaying the adhesive layer. A lower substrate is provided that has an upper surface and a lower surface, the upper surface being removably attached to and overlaying the second surface of the protective layer. A migrating ink pattern is on the lower surface of the lower substrate. To activate, the upper substrate and at least a portion of the lower substrate are removed from the protective layer to leave a remaining portion of the lower substrate having a portion of the migrating ink pattern thereon. The migrating ink pattern is then contacted with the exposed adhesive activator layer to activate the migrating ink pattern to migrate through the adhesive activator layer and upper substrate in a selected time interval for viewing from the upper surface of the upper support layer to indicate an expired badge or label. Preferably the migrating ink pattern is contacted with the adhesive layer by folding it onto the adhesive layer. Optionally, to activate the badge both substrates are completely removed from the protective layer and the migrating ink pattern is contacted with the adhesive layer.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Figure 1A:
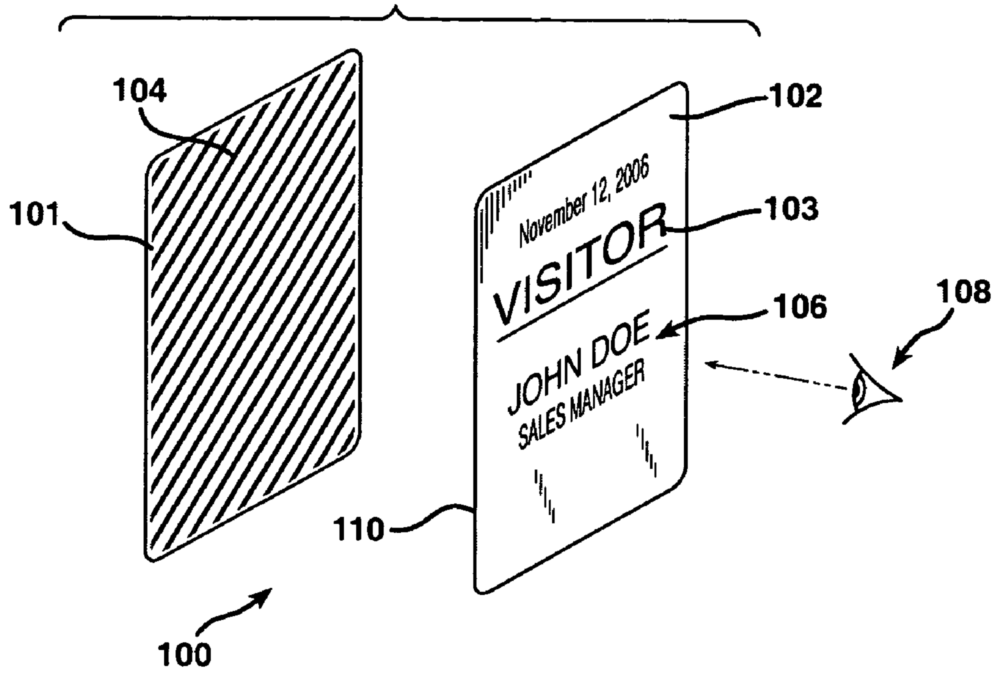
FIG. 1A PRIOR ART
FIGS. 1A and 1B is a schematic representation of prior art, self-expiring security badges or labels having a two-part construction.

FIG. 1A depicts a prior art self-expiring security badge or label 100 having a two-part construction. In this type of badge or label 100 the top substrate 102 consists of a clear substrate with a special opaque, e.g., white, adhesive coating on its back surface. The front or top surface of the top substrate 102 is typically printed with the security indicia 103 or design indicia 106 as viewed 108 from the front, and has an adhesive backing 110. The bottom substrate 101 includes a migrating ink pattern or indicia 104 printed on its front surface. When the self-expiring badge or label is activated by placing the top substrate 102 adhesive 110 in contact with the bottom substrate 101, the migrating ink 104 diffuses through the adhesive 110 and becomes visible to the observer 108 through the front face 102 of the badge or label 100. Thus, the initial opaque or white (valid) security badge 100 turns into the 'visually void' badge.

Figure 1B:
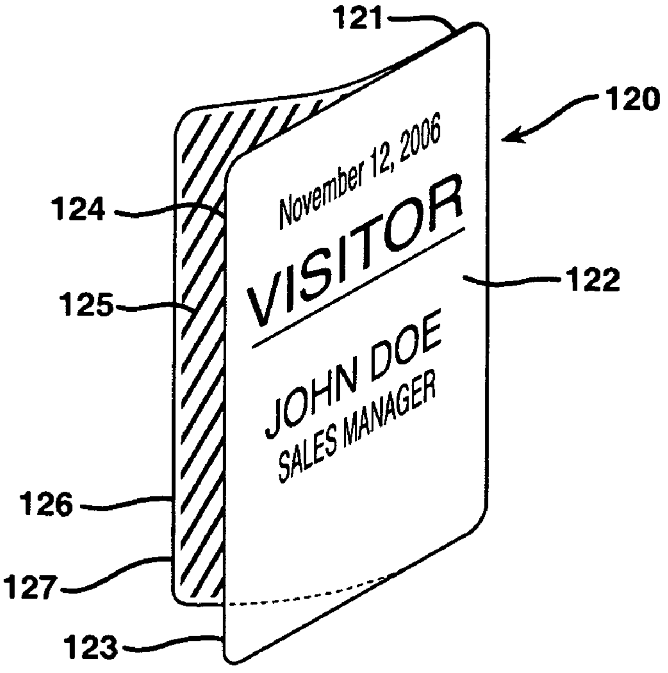
FIG. 1B PRIOR ART

An improved version of this two-part construction was developed, i.e., U.S. Pat. No. 5,107,470 to Pedicano et al. and consists of a preassembled badge or label. Referring to FIG. 1B, such preassembled badge or label 120 consists of a top substrate 122 and bottom substrate 126 which are attached to each other along one edge 121 so that only a single physical unit exits for handling. However, this preassembled badge or label 120 requires four separate layers: the top substrate label 122 with an adhesive layer 123 and a liner 124 covering the adhesive layer 123 to provide a barrier from the migrating ink indicia 125 that is on the bottom substrate 126. The front of the top substrate 122 is printed with the security indicia or design on the front surface. The bottom substrate 126 consists of a migrating ink 125 printed on the front face, an adhesive layer on the rear face, and a liner 127 covering the adhesive layer. Even though this preassembled construction is an improvement in handling and pre-aligning the top substrate 122 with the bottom substrate 126, the four material layers still present functional difficulties and cause a litter problem.

The one-piece security badge or label described and claimed herein provides a superior solution to the functional and handling difficulties of these previous preassembled constructions and additionally provides improvements in the production and use of self-expiring security badges or labels.

Figure 2A:
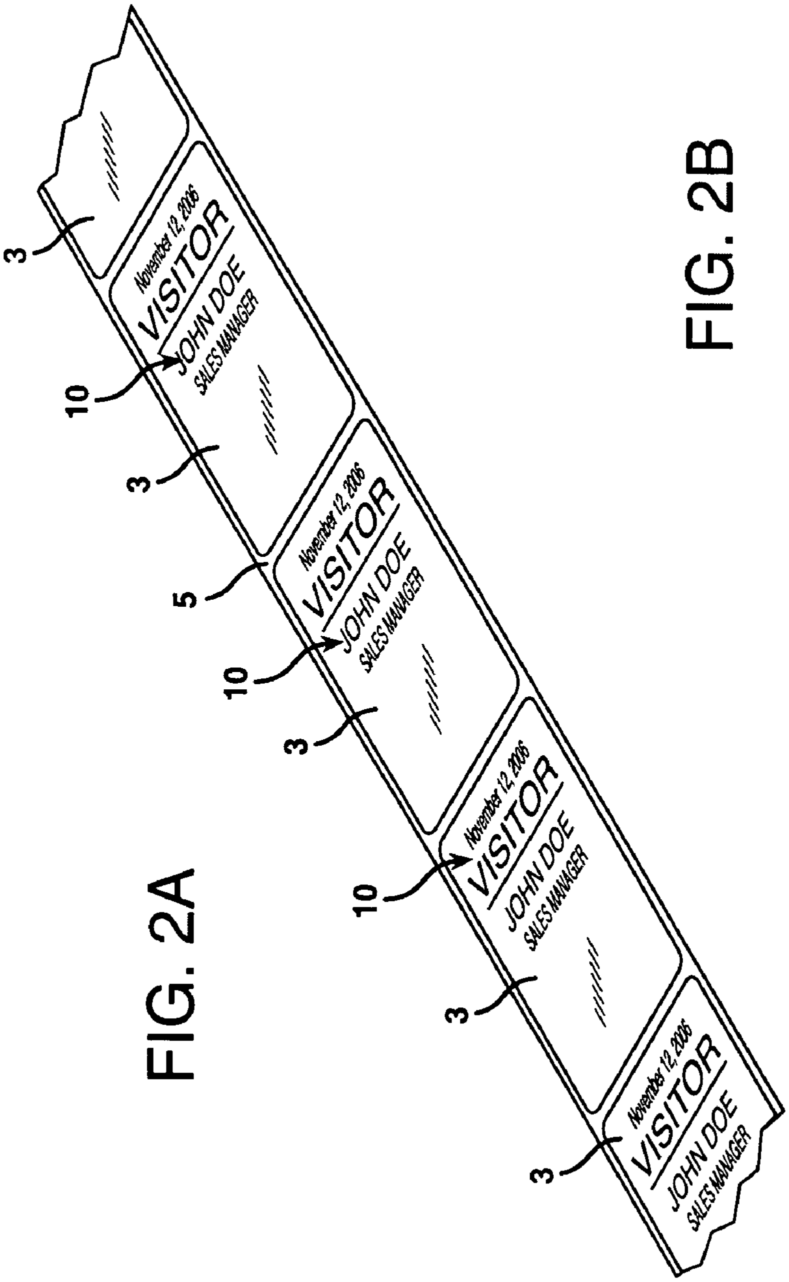
FIGS. 2A and 2B show, respectively, a perspective view and cross-sectional view of the one-piece, self-expiring badge or label of this invention prior to activation.
Figure 2B:
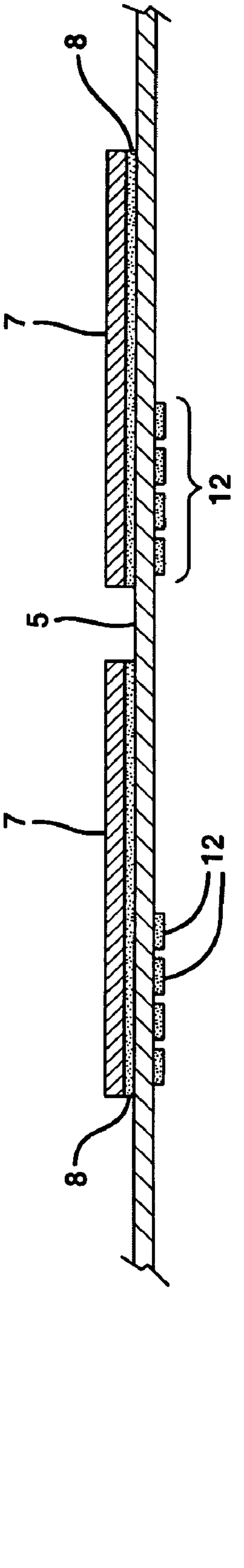

FIGS. 2A and 2B, shows the self-expiring badge or label of this invention prior to activation and as formed as a die cut label-like structure 3 on a continuous silicone liner web 5. The top substrate 7 has an identifying or security indicia 10 on the top surface thereof and an adhesive layer 8 on its underside for attaching to a display surface, e.g., clothing. The top substrate 7 is die-cut, preferably as a rectangle, on the silicone liner 5 that protects the adhesive layer 8. The self-expiring badge or label of this invention further includes a migrating ink pattern 12 printed on the backside or opposite side of the liner 5. The migrating ink pattern 12 contains a dye that migrates upon activation. The migrating ink pattern 12 and dye are inert and immobile when in contact with materials in which the dye is insoluble, e.g., the face of the top substrate 7. The migrating ink pattern 12 will not bleed when in contact with the various areas of the front or back of the web. This permits the continuous length of liner 5 containing the top substrate 7, adhesive layer 8 and migrating ink pattern 12 to be rolled up on itself. Thus, migrating ink pattern 12 is separated from the activating adhesive 8 intended for its eventual interaction. The liner 5 provides a protective barrier between the migrating ink pattern 12 and the activating adhesive 8 on the top substrate 7 of the expiring badge 3.

Figure 3A:
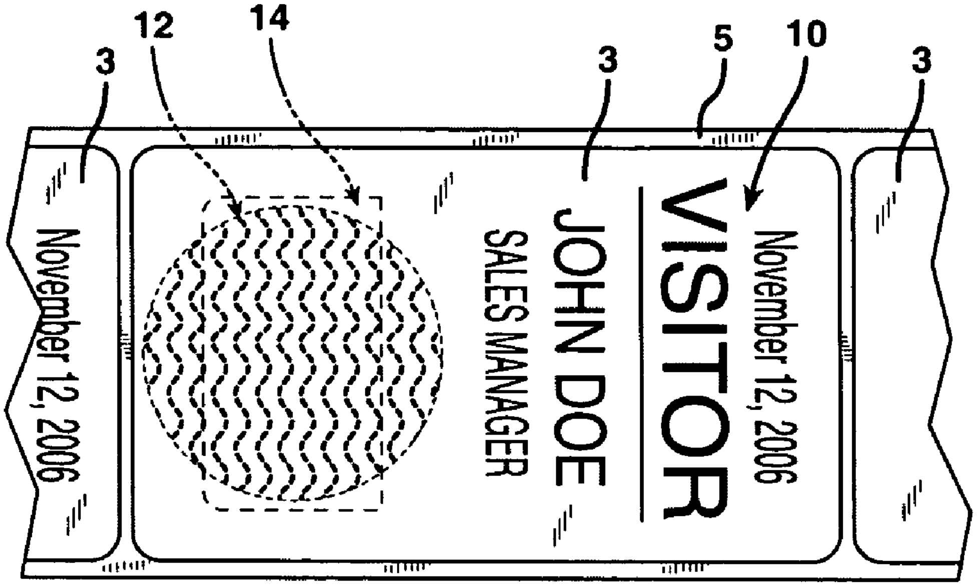
FIGS. 3A and 3B show, respectively, a top plan view and a bottom plan view of the self-expiring badge or label of this invention prior to activation.
Figure 3B:
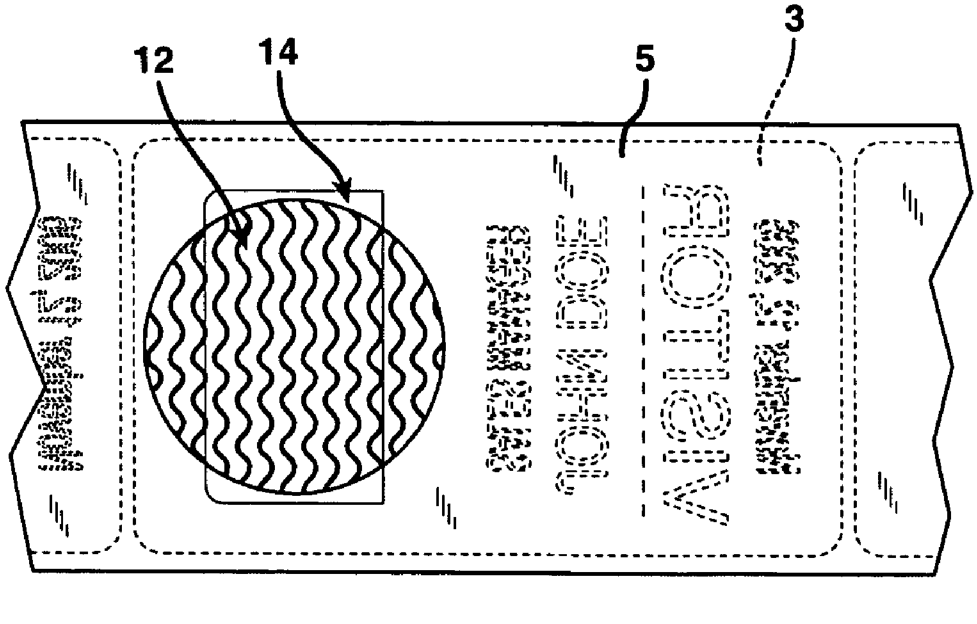

FIGS. 3A and 3B, shows, respectively, the top plan view and bottom plan view of the self-expiring badge or label of this invention prior to activation and use and as formed as a die cut label-like structure 3 on a continuous silicone liner web 5. A die cut bottom substrate 14 is cut from the liner 5 with the migrating ink 12 printed thereon. The die cut bottom substrate 14 can be any size or shape. Preferably substrate 14 is a rectangle near one end of the badge and has been die cut with few or no ties to the liner 5.

Figure 4A:
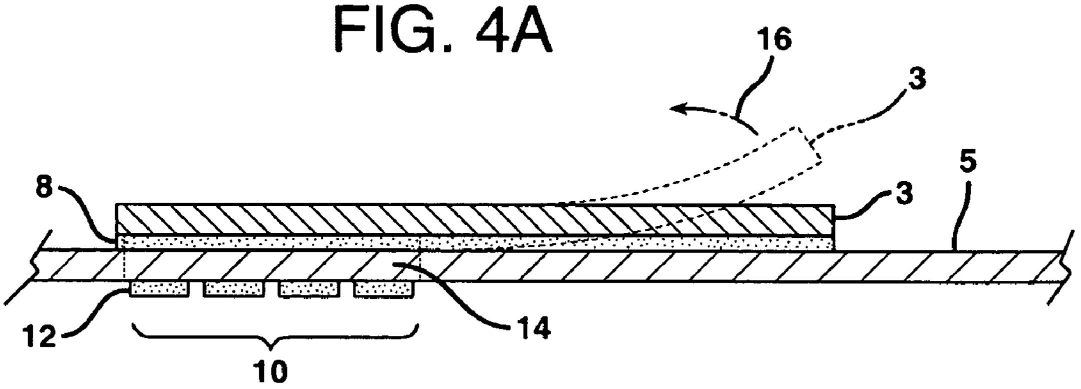
FIGS. 4A, 4B, 4C and 4D show, in a stepwise manner how the one-piece, self-expiring badge or label of this invention is activated.

FIG. 4A through 4D show in a stepwise manner how the one-piece, self expiring badge or label of this invention is activated and used. In FIG. 4A, the top substrate (label) 3 is peeled from the liner 5 (arrow 16) exposing the adhesive layer 8 on the underside thereof. Since the die cut section 14 with migrating ink pattern 12 thereon is not attached to liner 5 it remains attached to the adhesive layer 8.

Figure 4B:
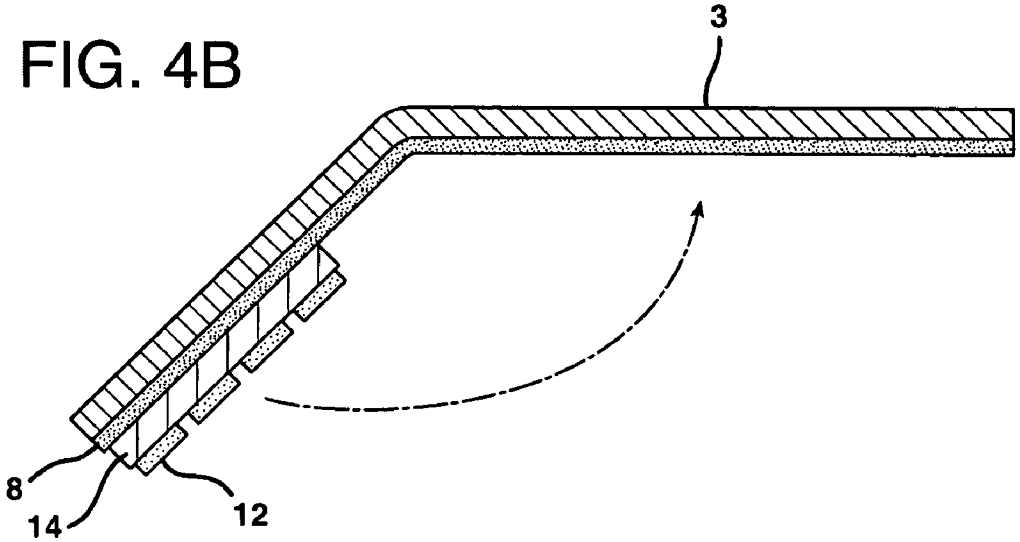
Figure 4C:
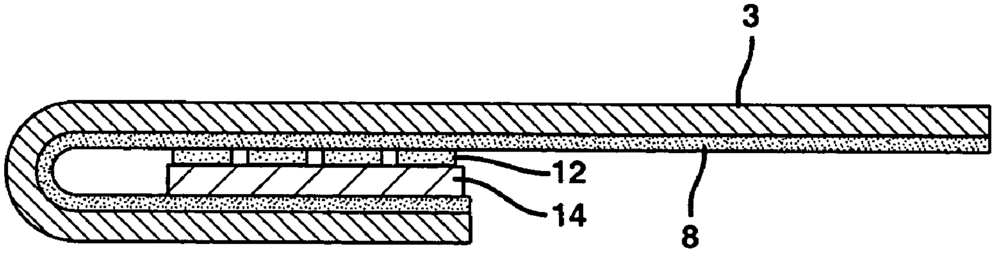
Figure 4D:
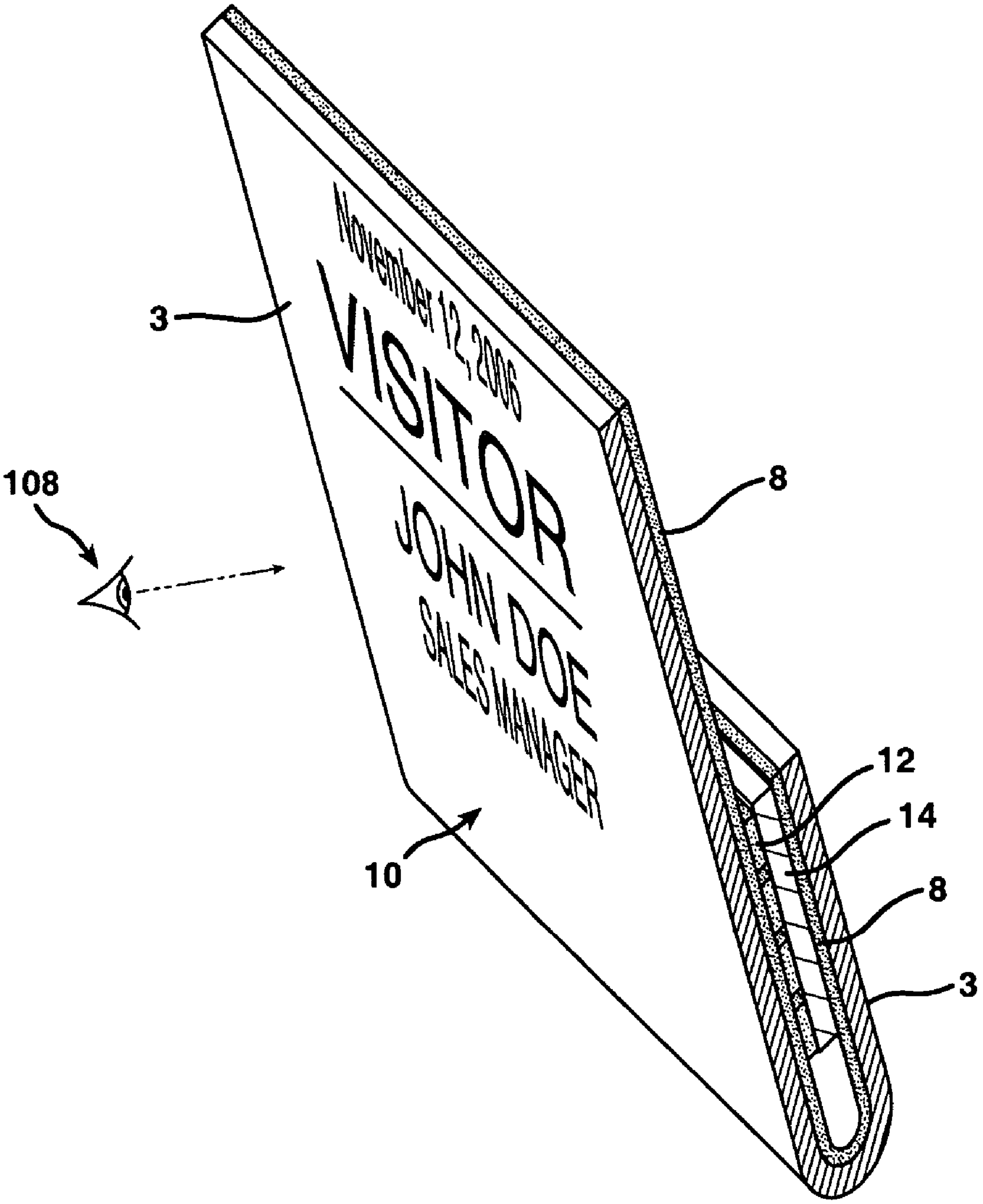

Referring to FIGS. 4B and 4C, after the label 3 of the badge is removed from the liner 5 the person issuing the badge simply folds the badge 3 near the edge of die cut bottom substrate 14 (FIG. 4B) and presses it in contact with the adhesive layer 8 (FIG. 4C). The badge is now activated and ready to issue to a person. As shown in FIG. 4D, the remaining portion of the adhesive layer eight is used to attach the badge to a visitor's clothing. Since there are no loose silicone liner pieces to litter the work area, this one-piece badge is more user friendly. Also, the continuous webliner 5 can be rolled up and easily disposed of in a small roll. Although, FIGS. 4A-D show one means of activating the badge or label, there are several means of activating the badge or label with this new type of construction.

Figure 5A:
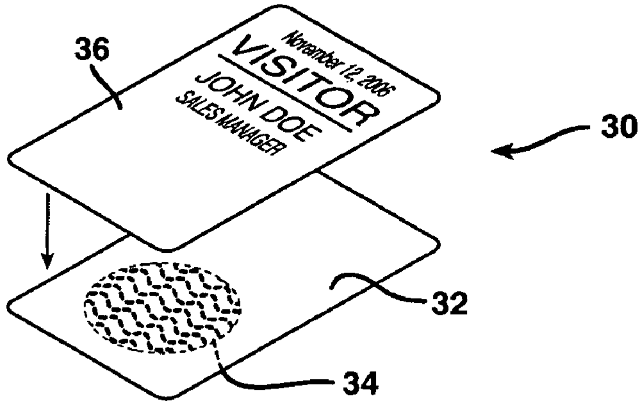
FIGS. 5A, 5B and 5C show in a stepwise manner how a second embodiment of the one-piece, self-expiring badge or label of this invention is activated.
Figure 5B:
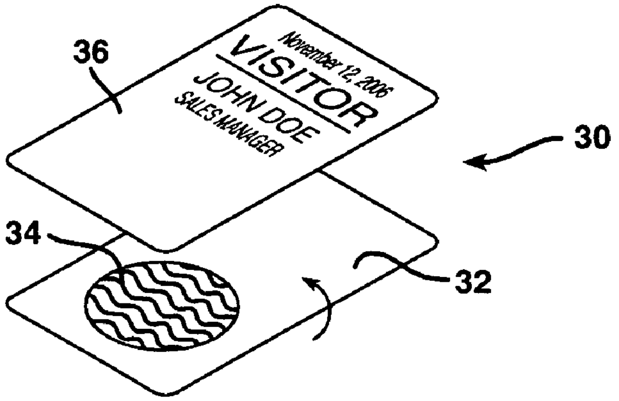
Figure 5C:
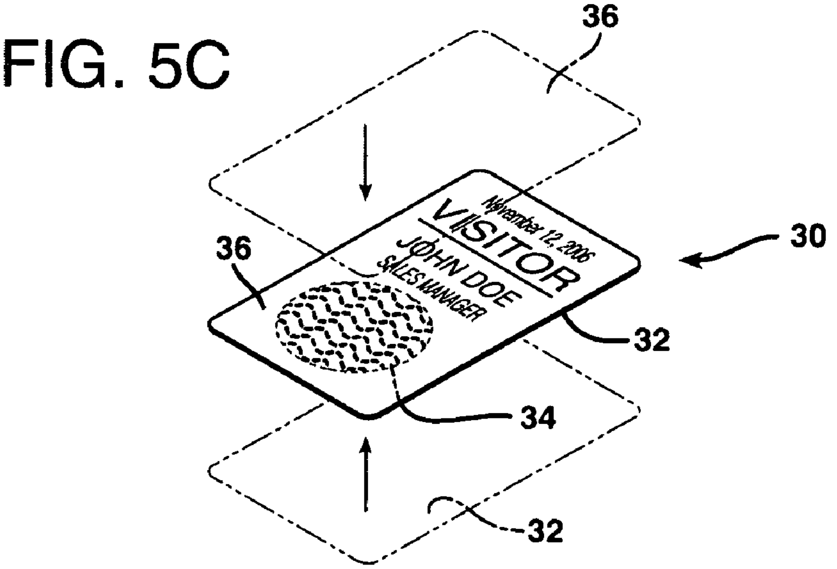

FIG. 5A-C shows an alternate construction of the badge or label 30 of this invention. In this arrangement, inactivated badge or label 30 can have the bottom-substrate 32 removably and adhesively attached to the underside of top substrate 36. The back of the bottom substrate 36 has the migrating ink pattern 34 printed thereon. The top substrate 36 has an activating adhesive on the back thereof. In FIG. 5A, the bottom substrate 32 is fully removed from the top substrate 36 prior to issuance of the badge or label. Optionally, still referring to FIG. 5A, the bottom substrate 32 and top substrate 36 can each be removably adhered to opposite sides of a silicone web liner (not shown). In FIG. 5B the bottom substrate 32 is being inverted such that the migrating ink pattern 34 is facing the activating adhesive on the underside of the top substrate 36. In FIG. 5C the top substrate 36 and the bottom substrate 32 are pressed together, the adhesive activating the migrating ink pattern 34.

In this alternate construction of the badge or label 30, both the top and bottom substrates 36, 32 may be die cut on a silicone liner similar to the configuration shown in FIGS. 2A & 2B. The bottom substrate 32 may be circular or rectangular and may be cut to a size and shape of the migrating ink pattern 34, and it may be fully die cut from the liner or it may have small die cut ties holding it onto the liner. These ties may be useful in maintaining the bottom substrate 32 when in circle form, from becoming detached when the web is rolled tightly. Tight rolls cause the liner to flex and curl, in which case a bottom circular substrate 32 may curl and separate at its edges. Optionally, additional silicone may be coated onto the back or underside of the liner to which the bottom substrate 32 is mounted making it easier to remove the bottom substrate 32.

As shown in FIG. 5A-C when the top substrate 36 is removed from the bottom substrate 32, the issuer, e.g., guard or receptionist, merely turns it over as shown by the arrow in FIG. 5B and attaches it to the adhesive again. This activates the self-expiring badge or label, the migrating ink 34 from the bottom substrate diffusing through the top substrate 36 to become visible on the face of the top substrate 36 when the badge or label has expired after a predetermined period of time has passed.

It may also be possible to apply the migrating ink pattern 34 to the back of the liner by other means, such as applying a removable coating to the back face of the silicone liner. It also may be possible to print the migrating ink on the back of the silicone liner in such a manner that the ink can be lifted off the liner itself by simply touching the adhesive on the top substrate 32 to the migrating ink pattern printed on back of the liner, the migrating ink pattern becoming firmly attached to the adhesive and hence, the migrating ink separates from the back of the liner and is lifted onto the back substrate 36 adhesive. This permits the migrating ink pattern to become attached to the top substrate 32 without the necessity for a substrate behind the migrating ink pattern.

In all of these embodiments, prior to activation, the top substrate adhesive is separated from the migrating ink pattern by a protective layer therebetween. The migrating ink pattern remains inert until it is in contact with the adhesive on the underside of the trop substrate.

This new construction of self-expiring security badges or labels produces a dynamic self-adhesive 'label-like' product that is constructed in exactly the same manner as standard adhesive labels. By offering a self-expiring product in the same format, thickness, and flexibility as plain paper labels, the same printing equipment can be used and the users of the product do not have to be trained in handling a more complicated product with multiple layers. The benefits of this new construction are a simple face stock and liner construction with the same mechanical properties as standard label stock, pre-aligned folding edges that permit easy handling, even with one hand, no separate waste paper that creates litter, lower cost because of the simpler construction, more badges or labels on each roll to accommodate small thermal printers, rolled badges or labels instead of fan folded badges or labels.

While various changes may be made in the detailed construction and processes of this invention, it will be understood that such changes will be within the spirit and scope of the present invention. Having thus described the invention in detail, it is to be understood that the foregoing description is not intended to limit the spirit and scope thereof. What is desired to be protected by Letters Patent is set forth in the appended claims.

What is claimed is:

1. A self-expiring badge or label comprising:

an upper substrate having an upper surface and a lower surface, an adhesive activator layer on the lower surface, a protective layer having a first surface and a second surface, the first surface removably attached to and overlaying the adhesive layer, a lower substrate having an upper surface and a lower surface, the upper surface removably attached to and overlaying the second surface of the protective layer, a migrating ink pattern on the lower surface of the lower substrate, whereby removing the upper substrate and at least a portion of the lower substrate from the protective layer to leave a remaining portion having the migrating ink pattern thereon, and contacting the migrating ink pattern to the exposed adhesive activator layer on the lower surface of the upper substrate to activate the migrating ink pattern to migrate through the adhesive activator layer and upper substrate in a selected time interval for viewing from the upper surface of the upper support layer to indicate an expired badge or label.

2. The self-expiring badge or label of claim 1, wherein the migrating ink pattern is contacted to a portion of the exposed adhesive activator layer, the remaining portion of the exposed adhesive activator layer for adhesively mounting the badge or label to a surface.

3. The self-expiring badge or label of claim 1, wherein the remaining portion of the lower substrate having the migrating ink pattern thereon is folded to contact the migrating ink pattern to the exposed adhesive activator label.

4. The self-expiring badge or label of claim 1, wherein the remaining portion of the lower substrate having the migrating ink pattern thereon is folded to contact the migrating ink pattern to a portion of the exposed adhesive activator layer, the remaining portion of the exposed adhesive activator layer for adhesively mounting the badge or label to a surface.

5. A self-expiring badge or label comprising:

an upper substrate having an upper surface and a lower surface, an adhesive activator layer on the lower surface, a protective layer having a first surface and a second surface, the first surface removably attached to and overlaying the adhesive layer, a lower substrate having an upper surface and a lower surface, the upper surface removably attached to and overlaying the second surface of the protective layer, a migrating ink pattern on the lower surface of the lower substrate, whereby removing the upper and lower substrate from the protective layer and contacting the migrating ink pattern to the adhesive activator layer on the lower surface of the upper substrate activates the migrating ink pattern to migrate through the adhesive activator layer and upper substrate in a selected time interval for viewing from the upper surface of the upper support layer to indicate an expired badge or label.

6. A self-expiring badge or label comprising:

an upper substrate having an upper surface and a lower surface, an adhesive activator layer on the lower surface, a protective layer having a first surface and a second surface, the first surface removably attached to and overlaying the adhesive layer, a lower substrate being removably attached to and overlaying the second surface of the protective layer, the lower substrate including a migrating ink pattern, whereby removing the upper and lower substrate from the protective layer and contacting the migrating ink pattern to the adhesive activator layer on the lower surface of the upper substrate activates the migrating ink pattern to migrate through the adhesive activator layer and upper substrate in a selected time interval for viewing from the upper surface of the upper support layer. layer to indicate an expired badge or label.

7. A process for activating a self-expiring badge or label comprising:

providing a self-expiring badge or label comprising:

an upper substrate having an upper surface and a lower surface, an adhesive activator layer on the lower surface, a protective layer having a first surface and a second surface, the first surface removably attached to and overlaying the adhesive layer, a lower substrate having an upper surface and a lower surface, the upper surface removably attached to and overlaying the second surface of the protective layer, a migrating ink pattern on the lower surface of the lower substrate, removing the upper substrate, removing at least a portion of the lower substrate from the protective layer to leave a remaining portion having the migrating ink pattern thereon, and contacting the migrating ink pattern to the exposed adhesive activator layer on the lower surface of the upper substrate, whereby the migrating ink pattern is activated to migrate through the adhesive activator layer and upper substrate in a selected time interval for viewing from the upper surface of the upper support layer to indicate an expired badge or label.

8. The process of claim 7, wherein the step of contacting includes folding the remaining portion of the lower substrate having the migrating ink pattern onto the exposed adhesive activator label.

9. The process of claim 8, wherein the step of contacting includes folding the migrating ink pattern onto a portion of the exposed adhesive activator layer, and adhesively mounting the remaining portion of the exposed adhesive activator layer to a surface to mount the badge or label.

* * * * *